US009503955B2

(12) United States Patent
Zhang

(10) Patent No.: US 9,503,955 B2
(45) Date of Patent: Nov. 22, 2016

(54) METHOD, APPARATUS AND SYSTEM FOR INFORMATION TRANSMISSION

(71) Applicant: Huawei Technologies Co., Ltd., Shenzhen, Guangdong (CN)

(72) Inventor: Hongzhuo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 180 days.

(21) Appl. No.: 14/163,781

(22) Filed: Jan. 24, 2014

(65) Prior Publication Data

US 2014/0140326 A1 May 22, 2014

Related U.S. Application Data

(63) Continuation of application No. PCT/CN2012/079470, filed on Aug. 1, 2012.

(30) Foreign Application Priority Data

Aug. 1, 2011 (CN) .......................... 2011 1 0218003
Aug. 10, 2011 (CN) .......................... 2011 1 0228794

(51) Int. Cl.
*H04W 4/00* (2009.01)
*H04W 36/36* (2009.01)
(Continued)

(52) U.S. Cl.
CPC ............. *H04W 36/36* (2013.01); *H04W 36/08* (2013.01); *H04W 24/08* (2013.01)

(58) Field of Classification Search
USPC ......................... 370/252, 328, 331, 338, 401
See application file for complete search history.

(56) References Cited

U.S. PATENT DOCUMENTS 8,306,538 B2 * 11/2012 Lee .................... H04W 24/10
455/436
8,577,360 B2 * 11/2013 Olsson ............... H04W 76/027
370/331

(Continued)

FOREIGN PATENT DOCUMENTS

CN 101931981 A 12/2010
CN 102083130 A 6/2011
WO WO 2010151064 A2 12/2010

OTHER PUBLICATIONS

"Logged MDT reporting when roaming," 3GPP TSG-RAN WG2 Meeting #72, Jacksonville, U.S., Document R2-106238, 3$^{rd}$ Generation Partnership Project, Valbonne, France (Nov. 15-19, 2010).

(Continued)

*Primary Examiner* — Ricky Ngo
*Assistant Examiner* — Christine Ng
(74) *Attorney, Agent, or Firm* — Leydig, Voit & Mayer, Ltd.

(57) ABSTRACT

Embodiments of the present invention provide a method for information transmission, including: a network entity of a source network determines whether a handover of a UE from the source network to a target network satisfies an information transmission rule; if the handover satisfies the information transmission rule, the network entity of the source network transmits information of the UE to a network entity of the target network; the information of the UE includes: MDT allowed status information of the UE and/or MDT configuration information of the UE. Embodiments of the present invention also provide an apparatus and a system for information transmission. When the UE performs a network handover, the present invention can avoid repeated MDT operations of the UE and save network resources.

14 Claims, 12 Drawing Sheets

(51) Int. Cl.
*H04W 36/08* (2009.01)
*H04W 24/08* (2009.01)

(56) References Cited

U.S. PATENT DOCUMENTS

| | | | | |
|---|---|---|---|---|
| 8,594,657 B2* | 11/2013 | Wu | ...................... | H04W 24/10 370/331 |
| 8,971,848 B2* | 3/2015 | Racz | ..................... | H04W 24/10 370/225 |
| 2005/0251363 A1 | 11/2005 | Turner et al. | | |
| 2010/0003974 A1* | 1/2010 | Zeng | ........................ | H04L 1/20 455/423 |
| 2010/0268674 A1* | 10/2010 | Dwyer | .............. | H04W 36/0066 706/12 |
| 2011/0117916 A1* | 5/2011 | Dahlen | ................. | H04W 48/08 455/436 |
| 2011/0319080 A1* | 12/2011 | Bienas | .................. | H04W 36/30 455/436 |
| 2012/0088457 A1 | 4/2012 | Johansson et al. | | |
| 2013/0016702 A1 | 1/2013 | Yan et al. | | |
| 2013/0021940 A1* | 1/2013 | Keskitalo | .......... | H04W 36/0088 370/252 |

OTHER PUBLICATIONS

"Equivalent PLMN Issues," 3GPP TSG-RAN Meetings #52, Bratislava, Slovakia, RP-110784, 3$^{rd}$ Generation Partnership Project, Valbonne, France (May 31-Jun. 3, 2011).

"Inter-PLMN MDT for operator that uses more than one PLMN—with ASN.1 implications," Change Request 37.320 CR CRNum, Version 10.2.0, 3GPP TSG-RAN2 Meeting #75, Athens, Greece, R2-113765, 3$^{rd}$ Generation Partnership Project, Valbonne, France (Aug. 22-26, 2011).

"LS on Equivalent PLMN identities and MDT," 3GPP TSG-SA #52, Bratislava, Slovakia, SP-110433, 3$^{rd}$ Generation Partnership Project, Valbonne, France (Jun. 6-8, 2011).

"3$^{rd}$ Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)," 3GPP TS 37.320, V10.2.0, pp. 1-17, 3$^{rd}$ Generation Partnership Project, Valbonne, France (Jun. 2011).

* cited by examiner

METHOD, APPARATUS AND SYSTEM FOR INFORMATION TRANSMISSION

CROSS-REFERENCE TO RELATED APPLICATIONS

This application is a continuation of International Patent Application No. PCT/CN2012/079470, filed on Aug. 1, 2012, which claims priorities to Chinese Patent Application No. 201110218003.9, filed on Aug. 1, 2011 and Chinese Patent Application No. 201110228794.3, filed on Aug. 10, 2011, all of which are hereby incorporated by reference in their entireties.

TECHNICAL FIELD

The present invention relates to the field of wireless communications, and more particularly to a method, an apparatus and a system for information transmission.

BACKGROUND

In wireless communication, in order to reduce traditional drive tests for network operation and maintenance and meanwhile obtain wireless measurement information of regions inaccessible by the traditional drive tests, an MDT (Minimization of Drive Tests, minimization of drive test) scheme is proposed by 3GPP (the 3rd Generation Partnership Project, 3rd generation partnership project) organization. In this scheme, a UE (User Equipment, user equipment) records network situations and positions at the recording time, and then reports them to a network side at an appropriate time, which is substituted for a part of the traditional drive tests.

The existing MDT scheme is only applicable to a scenario of one PLMN (Public Land Mobile Network, public land mobile network), however, there are often scenarios of a plurality of PLMNs in practical application, for example, the same operator owns a plurality of PLMNs at the same time, or different operators each own respective PLMNs, and so on. When the UE performs a handover between different PLMNs, performing MDT will cause the UE to execute repeated operations, thus increasing the burden of the UE and meanwhile wasting network resources.

SUMMARY

The present invention provides to a method, an apparatus and a system for information transmission, capable of avoiding repeated MDT operations of a UE and saving network resources, when the UE performs a network handover.

In one aspect, embodiments of present invention provide a method for information transmission, including:

determining, by a network entity of a source network, whether a handover of a UE from the source network to a target network satisfies an information transmission rule;

transmitting, by the network entity of the source network, information of the UE to a network entity of the target network when the handover satisfies the information transmission rule;

wherein the information of the UE includes: MDT allowed status information of the UE and/or MDT configuration information of the UE.

In another aspect, embodiments of present invention provide an apparatus for information transmission, including:

a determination unit, configured to determine whether a handover of a UE from a source network to a target network satisfies an information transmission rule;

an information transmission unit, configured to transmit information of the UE to a network entity of the target network, when the determination unit determines that the handover satisfies the information transmission rule, wherein the information of the UE includes: MDT allowed status information of the UE and/or MDT configuration information of the UE.

In another aspect, embodiments of present invention provide a system for information transmission, including the apparatus for information transmission described above.

Embodiments of the present invention have the following beneficial effects:

When a UE in embodiments of the present invention performs a handover from a source network to a target network, if the handover satisfies the information transmission rule, the information of the UE can be transmitted from the source network to the target network, and because the target network can directly obtain the information of the UE from the source network, it is not necessary to re-initiate an MDT request to the UE so as to obtain the information of the UE from the UE, thus avoiding repeated operations of the UE for the MDT request, reducing the burden of the UE and meanwhile saving network resources.

BRIEF DESCRIPTION OF DRAWINGS

In order to illustrate the technical solutions in embodiments of the present invention or the prior art more clearly, accompanying drawings needed in the embodiments or the prior art are illustrated briefly as follows. Apparently, the accompanying drawings are merely certain of embodiments of the present invention, and persons skilled in the art can derive other drawings from them without creative efforts.

DESCRIPTION OF EMBODIMENTS

Figure 1:
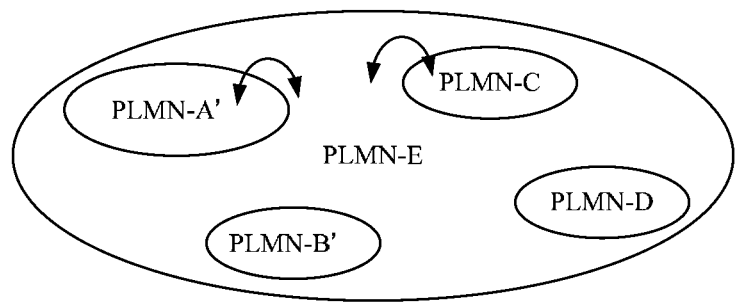
FIG. 1 is a schematic diagram of a scenario for a plurality of PLMNs according to an embodiment of the present invention.

The technical solutions in embodiments of the present invention are hereinafter described clearly and completely with reference to the accompanying drawings in the embodiments of the present invention. Obviously, the embodiments described here are part of the embodiments of the present invention and not all of the embodiments. All other embodiments obtained by persons skilled in the art on the basis of the embodiments of the present invention without any creative efforts all fall within the protection scope of the present invention.

In the solutions provided in the embodiments of the present invention, if a UE performs a handover from a source network to a target network, a network entity of the source network determines whether the handover satisfies an information transmission rule; if the handover satisfies the information transmission rule, then the network entity of the source network transmits information of the UE to a network entity of the target network; and the network entity of the target network can determine whether to select the UE to perform MDT according to the information of the UE.

The determining of the network entity of the source network as for whether the handover satisfies the information transmission rule can be made "when the UE performs the handover from the source network to the target network", that is, at a time when the UE prepares to perform the handover from the source network to the target network, or at a time when the UE is performing the handover from the source network to the target network, or at a time when the UE finishes the handover from the source network to the target network. In the handover, the source network is a network where the UE is located before the handover, and the target network is a network where the UE is located after the handover.

In the embodiments of the present invention, the information of the UE can include: MDT allowed status information of the UE and/or MDT configuration information of the UE. The MDT allowed status information of the UE is used to indicate a status whether the UE allows the MDT, i.e., indicate whether the UE agrees the MDT. The MDT allowed status information of the UE also can be called "user consent (user consent)" information. The embodiments of the present invention are described with user consent, and the user consent information can include that: user agreement information or user disagreement information; for example, if the user consent information includes an allowed (allowed) identifier, the user consent information is the user agreement information, indicating that the UE agrees to participate in the MDT; if the user consent information includes an not allowed (not allowed) identifier, the user consent information is the user disagreement information, indicating that the UE disagrees to participate in the MDT. The user consent information can include management based MDT allowed (management based MDT allowed) information, which is used by a base station to select the UE for management based MDT. The MDT configuration information can include configuration information needed by the UE to perform MDT, for example, MDT can include immediate MDT (immediate MDT) and logged MDT (logged MDT). In the logged MDT, the MDT configuration information can include job type (job type), area scope (area scope), trace reference (trace reference), trace recording session reference (trace recording session reference), trace collection entity identity (trace collection entity identity, TCE ID), logging interval (logging interval), logging duration (logging duration) or absolute time reference (absolute time reference) etc.; in the immediate MDT, the MDT configuration information can include job type (job type), area scope (area scope), list of measurements (list of measurements), report trigger (report trigger), report interval (report interval), report amount (report interval) or event threshold (event threshold) etc. The MDT configuration information also can be marked as MDT context information, that is, any configuration information relating to measurement and report.

In the embodiments of the present invention, the MDT can include the immediate MDT (immediate MDT) and the logged MDT (logged MDT). The MDT can be supported by extending a trace function, including signaling based trace (signalling based trace) and management based trace (management based trace) to support the MDT. In the embodiments of the present invention, in an immediate MDT mode of signaling based trace, the information of the UE can include the MDT configuration information of the UE; in an immediate MDT mode of management based trace, the information of the UE can include the user consent information of the UE and the MDT configuration information of the UE; in a logged MDT mode of management based, the information of the UE can include the user consent information of the UE.

The information transmission rule can be any one of the following rules: a configuration of a transmission from a source network to a target network is present in a PLMN transmission list, a source network and a target network are equivalent PLMNs defined in an EPLMN (Equivalent PLMN, equivalent public land mobile network) list of the UE, and a source network and a target network are EHPLMNs (Equivalent Home PLMN, equivalent home public land mobile network). The PLMN transmission list can be stored in the network entity of the source network, or can be included in the information of the UE. The PLMN transmission list stored in the network entity of the source network is applicable to handover determination of the network entity of the source network on all the UEs connected to the source network. The PLMN transmission list included in the information of the UE is applicable to handover determination of the network entity of the source network on the UE. The PLMN transmission list can include: a configuration of an unidirectional transmission of PLMN and/or a configuration of a bidirectional transmission of PLMN; both the configuration of the unidirectional transmission of PLMN and the configuration of the bidirectional transmission of PLMN define an information flow direction between two PLMNs, for example, if the PLMN transmission list includes the configuration of the unidirectional transmission from PLMN-A to PLMN-B, it indicates that information between the two PLMNs cannot be transmitted from PLMN-B to PLMN-A, but only can be transmitted from PLMN-A to PLMN-B; for another example, if the PLMN transmission list includes the configuration of the bidirectional transmission between PLMN-A and PLMN-B, it indicates that information between the two PLMNs not only can be transmitted from PLMN-A to PLMN-B, but also can be transmitted from PLMN-B to PLMN-A. The EPLMN list of the UE includes: identifiers of at least two PLMNs; the EPLMN list defines equivalent attributes of two or more PLMNs, that is, each PLMN corresponding to each PLMN identifier included in the EPLMN list is an equivalent PLMN; for example, if the EPLMN list includes an identifier of PLMN-A and an identifier of PLMN-B, it indicates that both PLMN-A and PLMN-B are the equivalent PLMNs.

The source network and the target network are EHPLMNs, which can be embodied in any of various manners as follows: (1) equivalent identifier, for identifying that the source network and the target network are EHPLMNs. Such manner can be implemented by extending the EPLMN list: an equivalent identifier can be added to the PLMN in the EPLMN list, and the PLMN identified by the equivalent identifier can be defined as the EHPLMN; for example, if the EPLMN list includes the identifier of PLMN-A and the identifier of PLMN-B, and the equivalent identifier can be added to the PLMN-A and the PLMN-B for identifying PLMN-A and PLMN-B being the EHPLMNs. (2) indication information, for indicating that the source network and the target network are EHPLMNs. Such manner can be implemented by indication information issued by an upper-layer node: the upper node issues the indication information to the network entity of the source network, and the indication information carries identifiers of the source network and the target network for indicating that the source network and the target network are EHPLMNs.

The system for information transmission provided in embodiments of the present invention will be described in details hereinafter with reference to FIG. 1.

The system for information transmission provided in embodiments of the present invention includes at least two networks and a UE connected to one of the networks. For example, a structure of the system for information transmission is shown in FIG. 1 which is a schematic diagram of a scenario for a plurality of PLMNs; in an example shown in FIG. 1, the system for information transmission can include five networks, which are respectively marked as PLMN-A', PLMN-B', PLMN-C, PLMN-D and PLMN-E. The at least two networks included in the system for information transmission provided in embodiments of the present invention can belong to different operators, for example, in the five networks shown in FIG. 1, PLMN-A' and PLMN-B' can be networks owned by an operator A, PLMN-C and PLMN-D can be networks owned by an operator B, and PLMN-E can be a network shared by the operator A and the operator B.

In the at least two networks included in the system for information transmission provided in embodiments of the present invention, if the UE performs a handover from one network to another network, a network entity of the source network determines whether the handover satisfies the information transmission rule, if the handover satisfies an information transmission rule, the network entity of the source network transmits information of the UE to a network entity of the target network; for example, in the example shown in FIG. 1, the UE is connected to PLMN-A', if the UE performs the handover from the PLMN-A' to PLMN-C, the network entity of the PLMN-A' determines whether the handover satisfies the information transmission rule, if the handover satisfies the information transmission rule, the network entity of the PLMN-A' transmits information of the UE to the network entity of the PLMN-C. Because the information of the UE is transmitted from the PLMN-A' to the PLMN-C, the network entity of the PLMN-C can determine whether to select the UE to perform MDT according to the information of the UE.

The target network in embodiments of the present invention can directly obtain the information of the UE from the source network, and it is not necessary to re-initiate an MDT request to the UE so as to obtain the information of the UE from the UE, thus avoiding repeated operations of the UE for the MDT request, reducing the burden of the UE and meanwhile saving network resources.

One embodiment of an apparatus for information transmission provided by the present invention will be described in details hereinafter with reference to FIG. 2.

Figure 2:
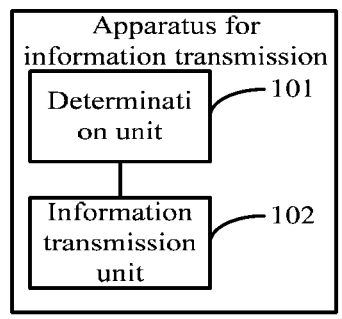
FIG. 2 is a schematic structural diagram of an apparatus for information transmission according to an embodiment of the present invention.

FIG. 2 is a schematic structural diagram of an apparatus for information transmission according to an embodiment of the present invention, and the apparatus for information transmission includes:

a determination unit 101, configured to determine whether a handover of a UE from a source network to a target network satisfies an information transmission rule.

The information transmission rule can include any one of the following rules: a configuration of a transmission from the source network to the target network is present in a PLMN transmission list, a source network and a target network are equivalent PLMNs defined in an EPLMN list of the UE, and a source network and a target network are EHPLMNs. The information of the UE includes: MDT allowed status information and/or MDT configuration information.

An information transmission unit 102, configured to transmit the information of the UE to a network entity of the target network, when the determination unit 101 determines that the handover satisfies the information transmission rule.

In this embodiment, the apparatus for information transmission can be a network entity of the source network. The apparatus for information transmission can include any one of an eNodeB (evolved Node B, evolved base station), an RNC (Radio Network Controller, radio network controller) and a core network element; the network entity of the target network also can include any one of an eNodeB, an RNC and a core network element; wherein the core network element includes any one of an MME (Mobility Management Entity, mobility management entity), an MSC-S (Mobile Switching Center Server, mobile switching center server), an SGW (Signaling Gateway, signaling gateway) and an SGSN (Serving Gprs Support Node, serving GPRS support node).

If the apparatus for information transmission is an eNodeB and the network entity of the target network is an eNodeB, the information transmission unit 102 can transmit the information of the UE to the eNodeB of the target network through an X2 interface. If the apparatus for information transmission is an RNC and the network entity of the target network is an RNC, the information transmission unit 102 can transmit the information of the UE to the RNC of the target network through an Iur interface. If the apparatus for information transmission is a core network element and the network entity of the target network is an eNodeB, the information transmission unit 102 can transmit the information of the UE to the eNodeB of the target network through an S1 interface. If the apparatus for information transmission is a core network element and the network entity of the target network is an RNC, the information transmission unit 102 can transmit the information of the UE to the RNC of the target network through an Iu interface. The X2 interface is an interface between an eNodeB and an eNodeB, the Iur interface is an interface between an RNC and an RNC, the S1 interface is an interface between a core network element and an eNodeB, and the Iu interface is an interface between a core network element and an RNC.

The determination unit 101 in the embodiment shown in FIG. 2 will be described in details hereinafter with reference to FIGS. 3 to 6.

Figure 3:
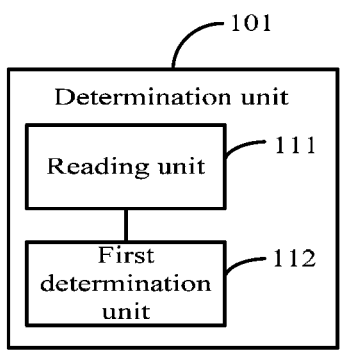
FIG. 3 is a schematic structural diagram of a determination unit shown in FIG. 2 according to an embodiment of the present invention.

FIG. 3 is a schematic structural diagram of a determination unit 101 shown in FIG. 2 according to an embodiment of the present invention. In this embodiment, the determination unit 101 makes a handover determination based on a PLMN transmission list, the PLMN transmission list is stored in the apparatus for information transmission, and the apparatus for information transmission can include a storage unit for storing the PLMN transmission list. The determination unit 101 includes:

a reading unit 111, configured to read the stored PLMN transmission list.

The PLMN transmission list is stored in the apparatus for information transmission, and the PLMN transmission list can be configured by an upper-layer node of the apparatus for information transmission through signaling or configured by an OAM system. When a UE performs a handover from the source network to the target network, the reading unit 111 reads the stored PLMN transmission list.

A first determination unit 112, configured to determine whether the configuration of the transmission from the source network to the target network is present in the PLMN transmission list read by the reading unit 111.

The first determination unit 112 determines whether the configuration of the transmission from the source network to the target network is present in the PLMN transmission list, if the first determination unit 112 determines that the PLMN transmission list includes a configuration of an unidirectional transmission from the source network to the target network, it indicates that information of the UE can be transmitted from the source network to the target network; if the first determination unit 112 determines that the PLMN transmission list includes a configuration of a bidirectional transmission between the source network and the target network, it indicates that the information of the UE can be transmitted from the source network to the target network; if the first determination unit 112 determines that the PLMN transmission list includes neither the configuration of the unidirectional transmission from the source network to the target network nor the configuration of the bidirectional transmission between the source network and the target network, it indicates that information of the UE cannot be transmitted from the source network to the target network.

Figure 4:
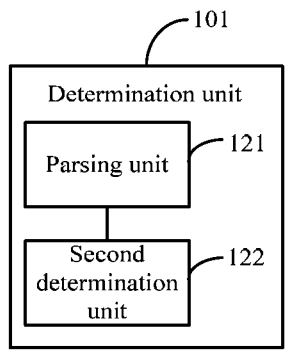
FIG. 4 is a schematic structural diagram of a determination unit shown in FIG. 2 according to another embodiment of the present invention.

FIG. 4 is a schematic structural diagram of a determination unit 101 shown in FIG. 2 according to another embodiment of the present invention; in this embodiment, the determination unit 101 is configured to make a handover determination based on a PLMN transmission list included in information of the UE. The determination unit 101 includes:

a parsing unit 121, configured to parse the information of the UE to obtain the PLMN transmission list.

In the embodiment of the present invention, user consent information of the UE can be extended to include the PLMN transmission list, the PLMN transmission list can be configured by an HSS (Home Subscriber Server, home subscriber server) of the source network according to subscriber subscription information corresponding to the UE, and be included in the user consent information of the UE. When the UE performs the handover from the source network to the target network, the parsing unit 121 parses the user consent information of the UE to obtain the PLMN transmission list.

In the embodiment of the present invention, MDT configuration information of the UE can be extended to include the PLMN transmission list, the PLMN transmission list can be configured by the HSS of the source network according to the subscriber subscription information corresponding to the UE, and be included in the MDT configuration information of the UE. When the UE performs the handover from the source network to the target network, the parsing unit 121 parses the MDT configuration information of the UE to obtain the PLMN transmission list.

It is noted that, if the information of the UE to be transmitted includes the user consent information of the UE and the MDT configuration information of the UE, the PLMN transmission list in the embodiment can be included in one or two of the user consent information of the UE and the MDT configuration information of the UE; when the PLMN transmission list is included in the user consent information of the UE or the MDT configuration information, the parsing unit 121 can parse the user consent information of the UE or the MDT configuration information to obtain the PLMN transmission list; when the PLMN transmission list is included in the user consent information of the UE and the MDT configuration information, the parsing unit 121 can select and parse one or two of the user consent information of the UE and the MDT configuration information to obtain the PLMN transmission list.

a second determination unit 122, configured to determine whether a configuration of a transmission from the source network to the target network is present in the PLMN transmission list obtained by the parsing unit 121.

The second determination unit 122 determines whether the configuration of the transmission from the source network to the target network is present in the PLMN transmission list, if the second determination unit 122 determines that the PLMN transmission list includes a configuration of an unidirectional transmission from the source network to the target network, it indicates that information of the UE can be transmitted from the source network to the target network; if the second determination unit 122 determines that the PLMN transmission list includes a configuration of a bidirectional transmission between the source network and the target network, it indicates that information of the UE can be transmitted from the source network to the target network; if the second determination unit 122 determines that the PLMN transmission list includes neither the configuration of the unidirectional transmission from the source network to the target network nor the configuration of the bidirectional transmission between the source network and the target network, it indicates that information of the UE cannot be transmitted from the source network to the target network.

Figure 5:
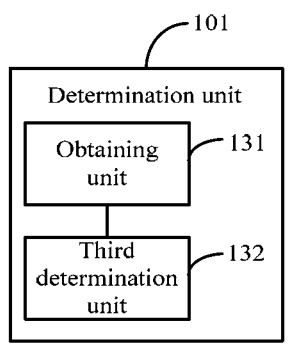
FIG. 5 is a schematic structural diagram of a determination unit shown in FIG. 2 according to another embodiment of the present invention.

FIG. 5 is a schematic structural diagram of a determination unit 101 shown in FIG. 2 according to another embodiment of the present invention; in this embodiment, the determination unit 101 is configured to make a handover determination based on an EPLMN list of the UE. The determination unit 101 includes:

an obtaining unit 131, configured to obtain the EPLMN list of the UE.

The EPLMN list of the UE can be included in an interactive message between the UE and the source network, for example, the EPLMN list of the UE can be included in an access message of the UE accessed to the source network; the obtaining unit 131 obtains the EPLMN list of the UE from the interactive message.

A third determination unit 132, configured to determine whether the source network and the target network are equivalent PLMNs according to the EPLMN list obtained by the obtaining unit 131.

The third determination unit 132 determines whether the source network and the target network are equivalent PLMNs defined in the EPLMN list of the UE. For example, if the EPLMN list includes the source network and the target network, the third determination unit 132 determines that the source network and the target network are the equivalent PLMNs, which indicates that information of the UE can be transmitted from the source network to the target network.

Figure 6:
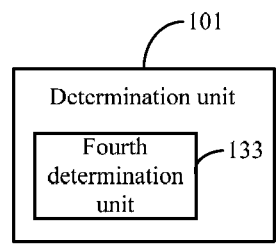
FIG. 6 is a schematic structural diagram of a determination unit shown in FIG. 2 according to another embodiment of the present invention.

FIG. 6 is a schematic structural diagram of a determination unit 101 shown in FIG. 2 according to another embodiment of the present invention, and the determination unit 101 includes:

a fourth determination unit 133, configured to determine whether there is an equivalent identifier for identifying that the source network and the target network are EHPLMNs; or determining whether indication information for indicating that the source network and the target network are EHPLMNs is received.

The fourth determination unit 133 is configured to determine whether there is the equivalent identifier, for example, the fourth determination unit 133 can determine whether there is the equivalent identifier in the EPLMN list of the UE to identify that the source network and the target network are EHPLMNs.

Or, the fourth determination unit 133 can be configured to determine whether the indication information is received, for example, the fourth determination unit 133 can determine whether indication information sent by an upper-layer node is received, wherein the indication information indicates that the source network and the target network are EHPLMNs.

If the fourth determination unit 133 determines that there is the equivalent identifier or determines that the indication information is received, it indicates that information of the UE can be transmitted from the source network to the target network.

When the UE performs network handover, the apparatus for information transmission provided in embodiments of the present invention determines whether the handover satisfies the information transmission rule, and if the determining result is yes, the information of the UE is transmitted from the source network to the target network, and because the target network can directly obtain the information of the UE from the source network, it is not necessary to re-initiate an MDT request to the UE so as to obtain the information of the UE from the UE, thus avoiding repeated operations of the UE for the MDT request, reducing the burden of the UE and meanwhile saving network resources.

Another embodiment of the apparatus for information transmission will be described in details hereinafter with reference to FIG. 7.

Figure 7:
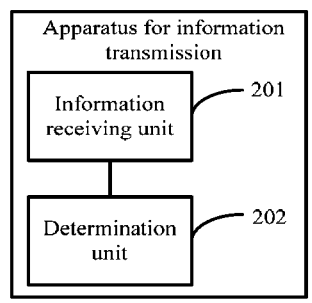
FIG. 7 is a schematic structural diagram of an apparatus for information transmission according to another embodiment of the present invention.

FIG. 7 is a schematic structural diagram of an apparatus for information transmission according to another embodiment of the present invention, and the apparatus for information transmission includes:

an information receiving unit 201, configured to receive information of a UE transmitted by a network entity of a source network.

The information of the UE includes: MDT allowed status information and/or MDT configuration information. In this embodiment, the apparatus for information transmission can be a network entity of a target network, or can be the network entity of the target network in the system for information transmission provided in embodiments of the present invention. The apparatus for information transmission according to the present embodiment can include any one of an eNodeB, an RNC and a core network element; the network entity of the source network also can include any one of an eNodeB, an RNC and a core network element; wherein the core network element includes any one of an MME, an MSC-S, an SGW and an SGSN.

If the network entity of the source network is an eNodeB and the apparatus for information transmission is an eNodeB, the information receiving unit 201 can receive the information of the UE transmitted by the eNodeB of the source network through an X2 interface. If the network entity of the source network is an RNC and the apparatus for information transmission is an RNC, the information receiving unit 201 can receive the information of the UE transmitted by the RNC of the source network through an Iur interface. If the network entity of the source network is a core network element and the apparatus for information transmission is an eNodeB, the information receiving unit 201 can receive the information of the UE transmitted by the core network element of the source network through an S1 interface. If the network entity of the source network is a core network element and the apparatus for information transmission is an RNC, the information receiving unit 201 can receive the information of the UE transmitted by the core network element of the source network through an Iu interface.

A determination unit 202, configured to determine whether to select the UE to perform MDT according to the information of the UE received by the information receiving unit 201.

The MDT allowed status information of the UE can be user agreement information or user disagreement information; if the information receiving unit 201 receives user agreement information and/or MDT configuration information of the UE, the determination unit 202 can determine to select the UE to perform MDT, or determine not to select the UE to perform MDT; if the information receiving unit 201 receives user disagreement information and/or MDT configuration information of the UE, the determination unit 202 determines not to select the UE to perform MDT.

When the UE performs network handover, the apparatus for information transmission provided in embodiments of the present invention receives the information of the UE transmitted by the source network, and because of directly obtaining the information of the UE from the source network, it is not necessary to re-initiate an MDT request to the UE so as to obtain the information of the UE from the UE, thus avoiding repeated operations of the UE for the MDT request, reducing the burden of the UE and meanwhile saving network resources.

Corresponding to any one of the apparatuses for information transmission provided in embodiments of the present invention shown in FIG. 1 to FIG. 6, the methods for information transmission provided in embodiments of the present invention will be described in details with reference to FIG. 8 to FIG. 19, and the apparatuses for information transmission provided in embodiments of the present invention can be applied to the methods for information transmission provided in the following embodiments of the present invention.

Figure 8:
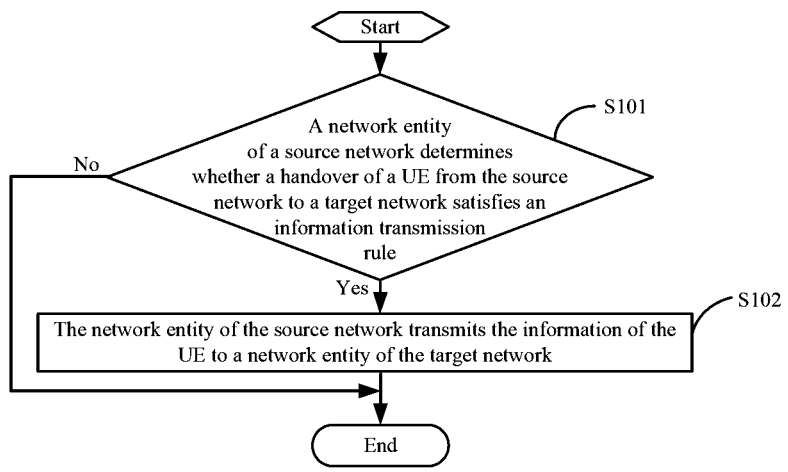
FIG. 8 is a flow chart of a method for information transmission according to an embodiment of the present invention.

FIG. 8 is a flow chart of a method for information transmission according to an embodiment of the present invention, and the method includes:

S101, a network entity of a source network determines whether a handover of a UE from a source network to a target network satisfies an information transmission rule.

In step S101, the information transmission rule can include any one of the following rules: a configuration of a transmission from a source network to a target network is present in a PLMN transmission list, a source network and a target network are equivalent PLMNs defined in an EPLMN list of the UE, and a source network and a target network are EHPLMNs. The information of the UE includes: MDT allowed status information and/or MDT configuration information.

S102, if the handover satisfies the information transmission rule, the network entity of the source network transmits the information of the UE to a network entity of the target network.

In this embodiment, the network entity of the source network can include any one of an eNodeB, an RNC and a core network element; and the network entity of the target network also can include any one of an eNodeB, an RNC and a core network element; wherein the core network element includes any one of an MME, an MSC-S, an SGW and an SGSN.

The method for information transmission will be described in details hereinafter with reference to FIGS. 9 to 12 when the network entity of the source network is an eNodeB and the network entity of the target network is an eNodeB.

Figure 9:
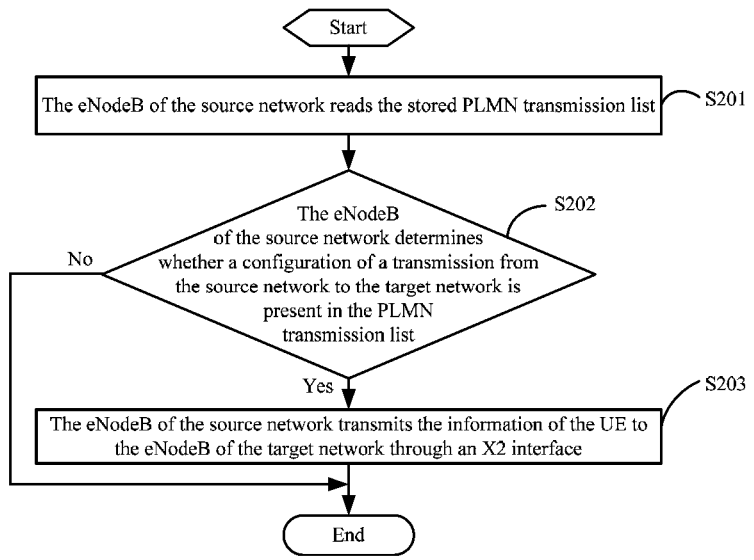
FIG. 9 is a flow chart of a method for information transmission according to another embodiment of the present invention.

FIG. 9 is a flow chart of a method for information transmission according to another embodiment of the present invention; in this embodiment, a handover determination is made based on a PLMN transmission list stored in the network entity of the source network. The method includes:

S201, the eNodeB of the source network reads the stored PLMN transmission list.

The PLMN transmission list is stored in the eNodeB of the source network, and the PLMN transmission list can be configured by an upper-layer node of the eNodeB of the source network through signaling or configured by an OAM system. In step S201, when a UE performs a handover from the source network to the target network, the eNodeB of the source network reads the stored PLMN transmission list.

S202, the eNodeB of the source network determines whether a configuration of a transmission from the source network to the target network is present in the PLMN transmission list, if the determining result is yes, the process turns to step S203; otherwise, the process ends.

In step S202, the eNodeB of the source network determines whether the configuration of the transmission from the source network to the target network is present in the PLMN transmission list, if determines that the PLMN transmission list includes a configuration of an unidirectional transmission from the source network to the target network, it indicates that information of the UE can be transmitted from the source network to the target network; if determines that the PLMN transmission list includes a configuration of a bidirectional transmission between the source network and the target network, it indicates that the information of the UE can be transmitted from the source network to the target network; if determines that the PLMN transmission list includes neither the configuration of the unidirectional transmission from the source network to the target network nor the configuration of the bidirectional transmission between the source network and the target network, it indicates that information of the UE cannot be transmitted from the source network to the target network.

S203, the eNodeB of the source network transmits the information of the UE to the eNodeB of the target network through an X2 interface.

The MDT allowed status information of the UE can be user agreement information or user disagreement information; in step S203, if the eNodeB of the source network transmits the user agreement information and/or the MDT configuration information of the UE to the eNodeB of the target network, the eNodeB of the target network can determine to select the UE to perform MDT, or determine not to select the UE to perform the MDT; if the eNodeB of the source network transmits the user disagreement information and/or the MDT configuration information of the UE to the eNodeB of the target network, the eNodeB of the target network determines not to select the UE to perform the MDT.

Figure 10:
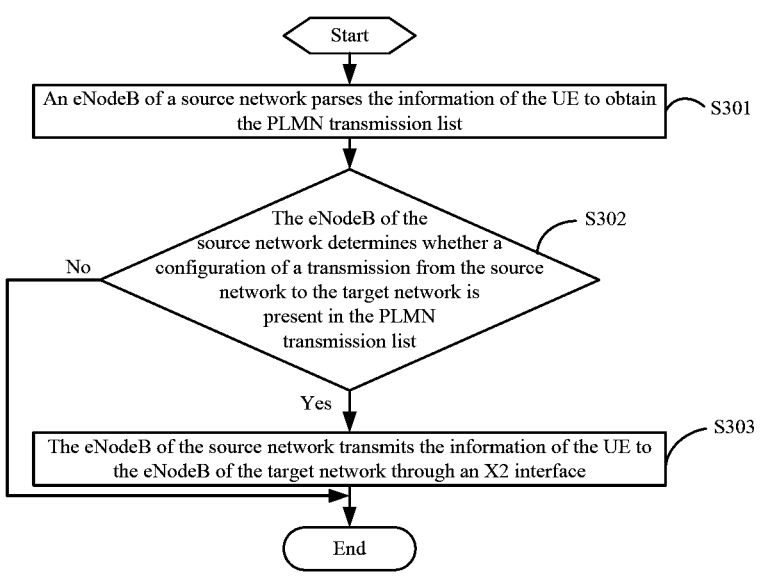
FIG. 10 is a flow chart of a method for information transmission according to another embodiment of the present invention.

FIG. 10 is a flow chart of a method for information transmission according to another embodiment of the present invention; in this embodiment, a handover determination according to this embodiment is made based on a PLMN transmission list included in information of the UE. The method includes:

S301, an eNodeB of a source network parses the information of the UE to obtain the PLMN transmission list.

In the embodiment of the present invention, user consent information of the UE can be extended to include the PLMN transmission list, the PLMN transmission list can be configured by an HSS of the source network according to subscriber subscription information corresponding to the UE, and be included in the user consent information of the UE. In step S301, when the UE performs a handover from the source network to a target network, the eNodeB of the source network parses the user consent information of the UE to obtain the PLMN transmission list.

In the embodiment of the present invention, MDT configuration information of the UE can be extended to include the PLMN transmission list, the PLMN transmission list can be configured by the HSS of the source network according to the subscriber subscription information corresponding to the UE, and be included in the MDT configuration information of the UE. In step S301, when the UE performs the handover from the source network to the target network, the eNodeB of the source network parses the MDT configuration information of the UE to obtain the PLMN transmission list.

It should be noted that, if the information of the UE to be transmitted includes the user consent information of the UE and the MDT configuration information of the UE, the PLMN transmission list in the embodiment can be included in one or two of the user consent information of the UE and the MDT configuration information of the UE; when the PLMN transmission list is included in the user consent information of the UE or the MDT configuration information, the eNodeB of the source network can parse the user consent information of the UE or the MDT configuration information to obtain the PLMN transmission list; when the PLMN transmission list is included in the user consent information of the UE and the MDT configuration information, the eNodeB of the source network can select and parse one or two of the user consent information of the UE and the MDT configuration information to obtain the PLMN transmission list.

S302, the eNodeB of the source network determines whether a configuration of a transmission from the source network to the target network is present in the PLMN transmission list, if the determining result is yes, the process turns to step S303; otherwise, the process ends.

S303, the eNodeB of the source network transmits the information of the UE to the eNodeB of the target network through an X2 interface.

In this embodiment, step S303 can be implemented with reference to the step S203 in the embodiment shown in FIG. 9, and no details will be given herein.

Figure 11:
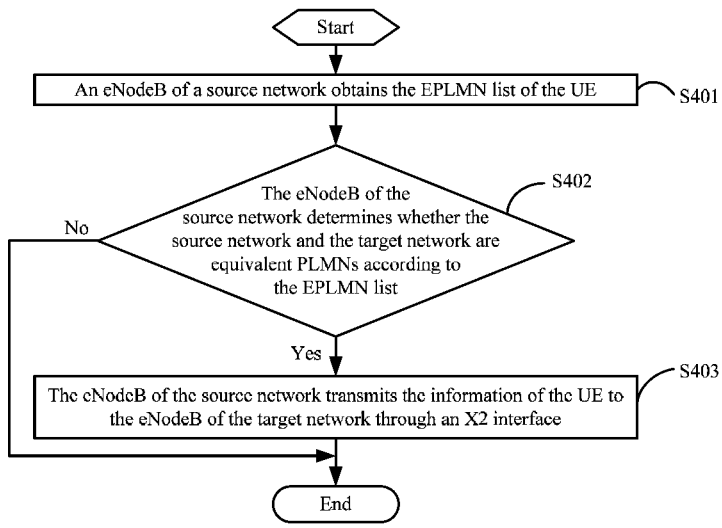
FIG. 11 is a flow chart of a method for information transmission according to another embodiment of the present invention.

FIG. 11 is a flow chart of a method for information transmission according to another embodiment of the present invention; in this embodiment, a handover determination is made based on an EPLMN list of the UE. The method includes:

S401, an eNodeB of a source network obtains the EPLMN list of the UE.

The EPLMN list of the UE can be included in an interactive message between the UE and the source network, for example, the EPLMN list of the UE can be included in an access message of the UE accessed to the source network; in step S401, the eNodeB of the source network obtains the EPLMN list of the UE from the interactive message.

S402, the eNodeB of the source network determines whether the source network and the target network are equivalent PLMNs according to the EPLMN list, if the determining result is yes, the process turns to step S403; otherwise, the process ends.

In step S402, the eNodeB of the source network determines whether the source network and the target network are equivalent PLMNs defined in the EPLMN list of the UE. For example, if the EPLMN list includes the source network and the target network, the eNodeB of the source network determines that the source network and the target network are the equivalent PLMNs, which indicates that information of the UE can be transmitted from the source network to the target network.

S403, the eNodeB of the source network transmits the information of the UE to the eNodeB of the target network through an X2 interface.

In this embodiment, step S403 can be implemented with reference to the step S203 shown in FIG. 9, and no details will be given herein.

Figure 12:
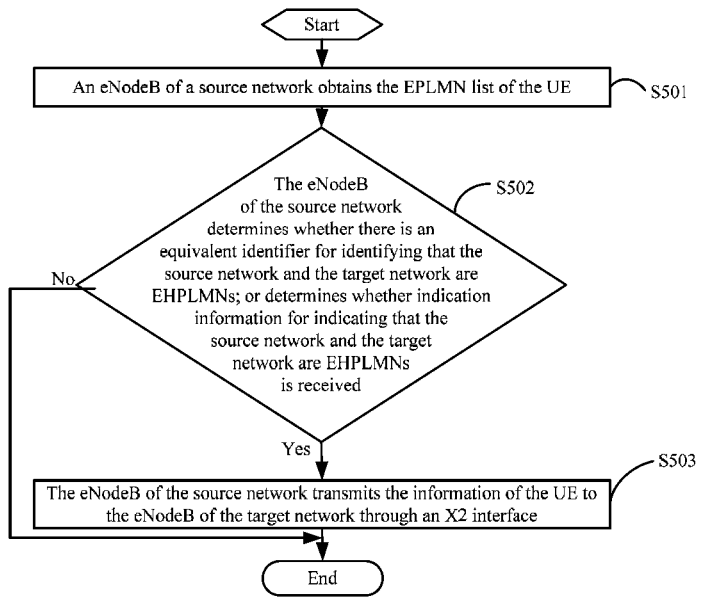
FIG. 12 is a flow chart of a method for information transmission according to another embodiment of the present invention.

FIG. 12 is a flow chart of a method for information transmission according to another embodiment of the present invention; in this embodiment, a handover determination is made based on an EPLMN list of the UE. The method includes:

S501, an eNodeB of a source network obtains the EPLMN list of the UE.

In this embodiment, step S501 can be implemented with reference to the step S401 shown in FIG. 11, and no details will be given herein.

S502, the eNodeB of the source network determines whether there is an equivalent identifier for identifying that the source network and the target network are EHPLMNs; or determines whether indication information for indicating that the source network and the target network are EHPLMNs is received, if the determining result is yes, the process turns to step S503; otherwise, the process ends.

In step S502, the eNodeB of the source network determines whether there is the equivalent identifier, for example, the eNodeB of the source network can determine whether there is the equivalent identifier in the EPLMN list of the UE to identify that the source network and the target network are EHPLMNs.

Or, in step S502, the eNodeB of the source network determines whether the indication information is received, for example, the eNodeB of the source network can determine whether indication information sent by an upper-layer node is received, wherein the indication information indicates that the source network and the target network are EHPLMNs.

If the eNodeB of the source network determines that there is the equivalent identifier or determines that the indication information is received, it indicates that information of the UE can be transmitted from the source network to the target network.

S503, the eNodeB of the source network transmits the information of the UE to the eNodeB of the target network through an X2 interface.

In this embodiment, step S503 can be implemented with reference to the step S203 shown in FIG. 9, and no details will be given herein.

The method for information transmission will be described in details hereinafter with reference to FIGS. 13 to 16 when the network entity of the source network is an RNC and the network entity of the target network is an RNC.

Figure 13:
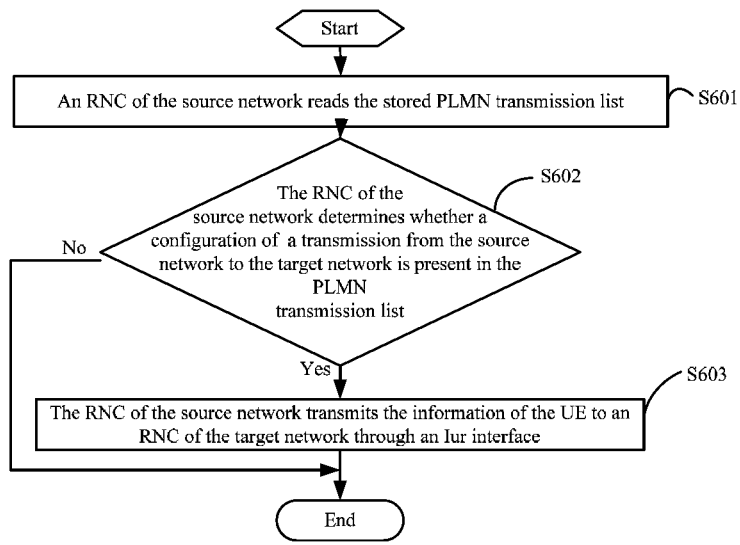
FIG. 13 is a flow chart of a method for information transmission according to another embodiment of the present invention.

FIG. 13 is a flow chart of a method for information transmission according to another embodiment of the present invention; in this embodiment, a handover determination is made based on a PLMN transmission list stored in the network entity of the source network. The method includes:

S601, an RNC of the source network reads the stored PLMN transmission list.

S602, the RNC of the source network determines whether a configuration of a transmission from the source network to the target network is present in the PLMN transmission list, if the determining result is yes, the process turns to step S603; otherwise, the process ends.

S603, the RNC of the source network transmits information of the UE to an RNC of the target network through an Iur interface.

In this embodiment, step S601 to step S603 can be implemented with reference to the step S201 to step S203 in the embodiment shown in FIG. 9, and no details will be given herein.

Figure 14:
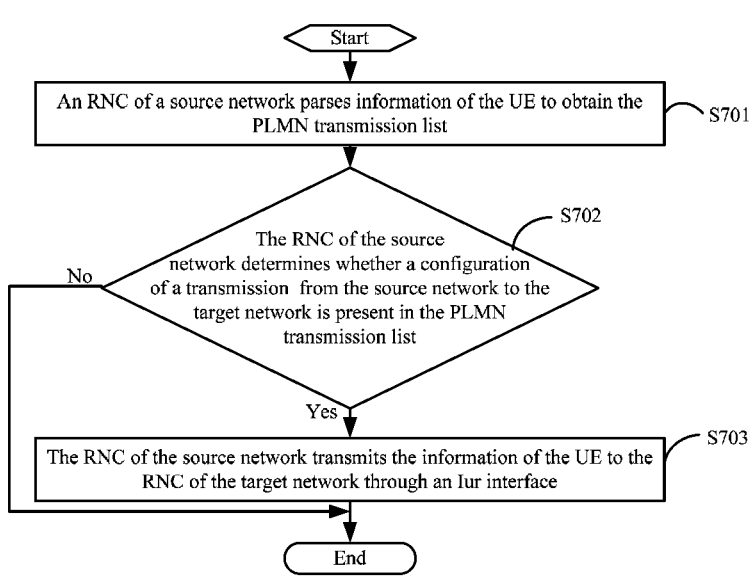
FIG. 14 is a flow chart of a method for information transmission according to another embodiment of the present invention.

FIG. 14 is a flow chart of a method for information transmission according to another embodiment of the present invention; in this embodiment, a handover determination is made based on a PLMN transmission list included in information of the UE. The method includes:

S701, an RNC of a source network parses information of the UE to obtain the PLMN transmission list.

S702, the RNC of the source network determines whether a configuration of a transmission from the source network to the target network is present in the PLMN transmission list, if the determining result is yes, the process turns to step S703; otherwise, the process ends.

S703, the RNC of the source network transmits the information of the UE to the RNC of the target network through an Iur interface.

In this embodiment, step S701 to step S703 can be implemented with reference to the step S301 to step S303 in the embodiment shown in FIG. 10, and no details will be given herein.

Figure 15:
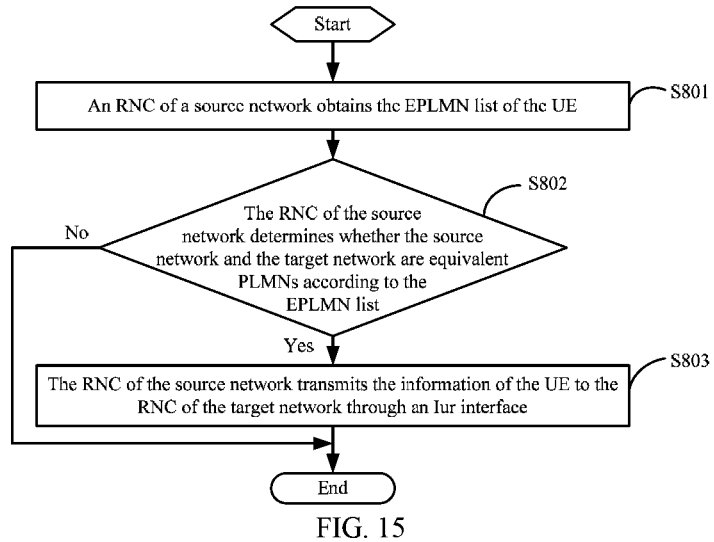
FIG. 15 is a flow chart of a method for information transmission according to another embodiment of the present invention.

FIG. 15 is a flow chart of a method for information transmission according to another embodiment of the present invention; in this embodiment, a handover determination is made based on an EPLMN list of the UE. The method includes:

S801, when a UE performs a handover from a source network to a target network, an RNC of the source network obtains the EPLMN list of the UE.

S802, the RNC of the source network determines whether the source network and the target network are equivalent PLMNs according to the EPLMN list, if the determining result is yes, the process turns to step S803; otherwise, the process ends.

S803, the RNC of the source network transmits information of the UE to the RNC of the target network through an Iur interface.

In this embodiment, step S801 to step S803 can be implemented with reference to the step S401 to step S403 in the embodiment shown in FIG. 11, and no details will be given herein.

Figure 16:
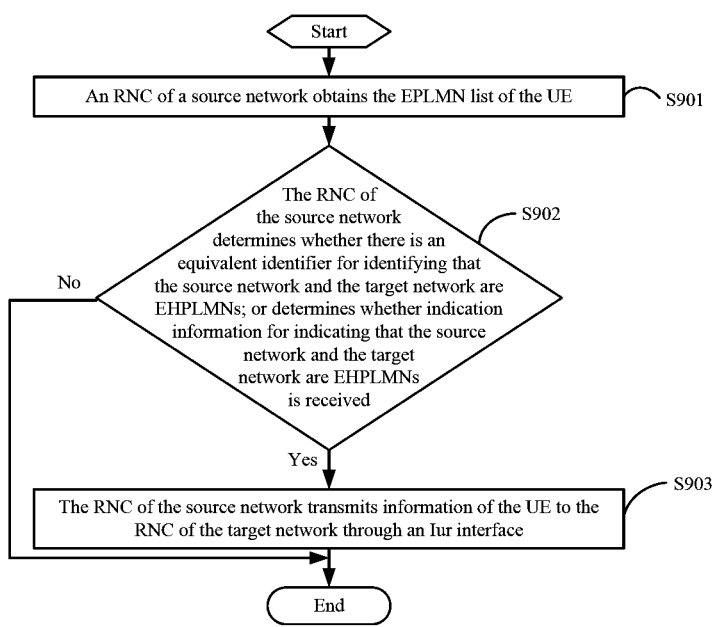
FIG. 16 is a flow chart of a method for information transmission according to another embodiment of the present invention.

FIG. 16 is a flow chart of a method for information transmission according to another embodiment of the present invention; in this embodiment, a handover determination is made based on an EPLMN list of the UE. The method includes:

S901, when a UE performs a handover from a source network to a target network, an RNC of a source network obtains the EPLMN list of the UE.

S902, the RNC of the source network determines whether there is an equivalent identifier for identifying that the source network and the target network are EHPLMNs; or determines whether indication information for indicating that the source network and the target network are EHPLMNs is received, if the determining result is yes, the process turns to step S903; otherwise, the process ends.

S903, the RNC of the source network transmits information of the UE to the RNC of the target network through an Iur interface.

In this embodiment, step S901 to step S903 can be implemented with reference to the step S501 to step S503 in the embodiment shown in FIG. 12, and no details will be given herein.

The method for information transmission will be described in details hereinafter with reference to FIGS. 17 to 20 when the network entity of the source network is a core network element and the network entity of the target network is an eNodeB.

Figure 17:
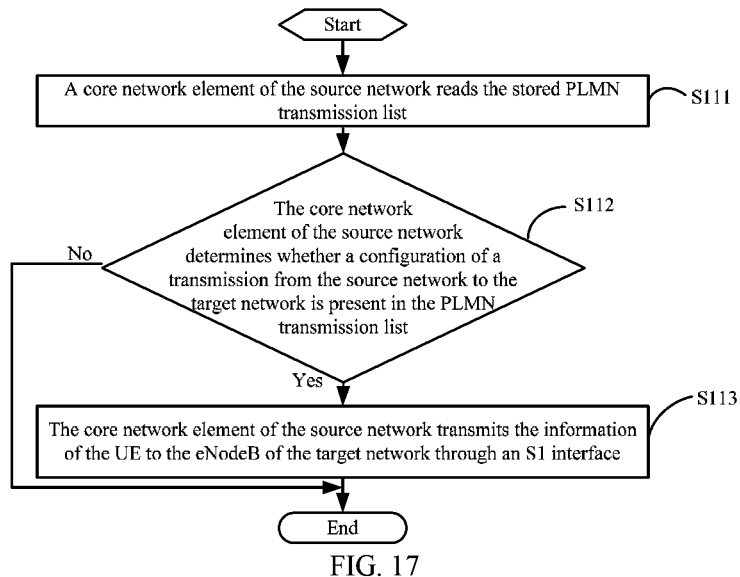
FIG. 17 is a flow chart of a method for information transmission according to another embodiment of the present invention.

FIG. 17 is a flow chart of a method for information transmission according to another embodiment of the present invention; in this embodiment, a handover determination is made based on a PLMN transmission list stored in a network entity of a source network. The method includes:

S111, a core network element of the source network reads the stored PLMN transmission list.

S112, the core network element of the source network determines whether a configuration of a transmission from the source network to the target network is present in the PLMN transmission list, if the determining result is yes, the process turns to step S113; otherwise, the process ends.

S113, the core network element of the source network transmits information of the UE to the eNodeB of the target network through an S1 interface.

In this embodiment, step S111 to step S113 can be implemented with reference to the step S201 to step S203 in the embodiment shown in FIG. 9, and no details will be given herein.

Figure 18:
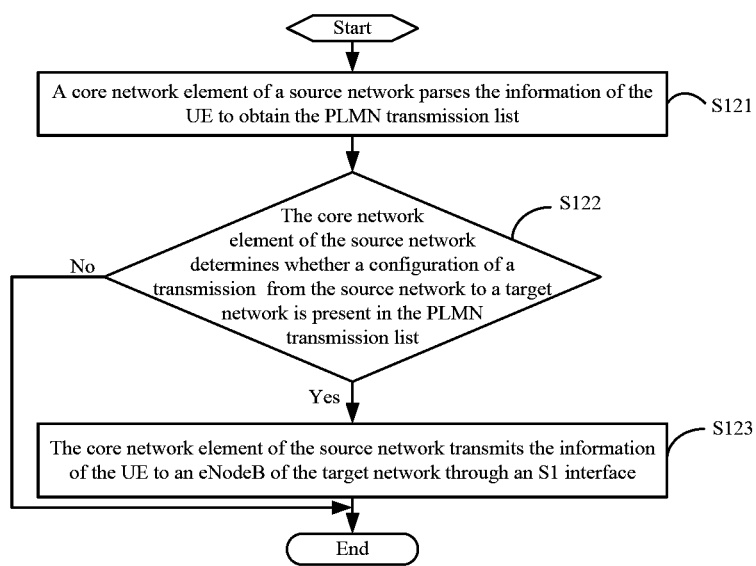
FIG. 18 is a flow chart of a method for information transmission according to another embodiment of the present invention.

FIG. 18 is a flow chart of a method for information transmission according to another embodiment of the present invention; in this embodiment, a handover determination is made based on a PLMN transmission list included in information of the UE. The method includes:

S121, a core network element of a source network parses the information of the UE to obtain the PLMN transmission list.

S122, the core network element of the source network determines whether a configuration of a transmission from the source network to a target network is present in the PLMN transmission list, if the determining result is yes, the process turns to step S123; otherwise, the process ends.

S123, the core network element of the source network transmits the information of the UE to an eNodeB of the target network through an S1 interface.

In this embodiment, step S121 to step S123 can be implemented with reference to the step S301 to step S303 in the embodiment shown in FIG. 10, and no details will be given herein.

Figure 19:
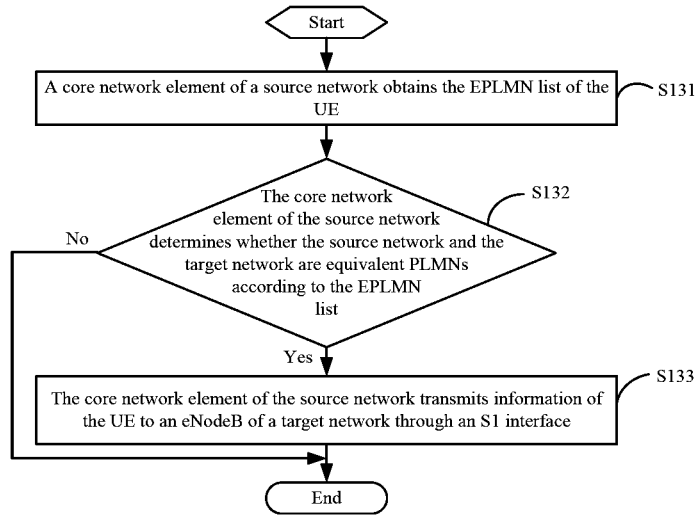
FIG. 19 is a flow chart of a method for information transmission according to another embodiment of the present invention.

FIG. 19 is a flow chart of a method for information transmission according to another embodiment of the present invention; in this embodiment, a handover determination is made based on an EPLMN list of the UE. The method includes:

S131, a core network element of a source network obtains the EPLMN list.

S132, the core network element of the source network determines whether the source network and the target network are equivalent PLMNs according to the EPLMN list, if the determining result is yes, the process turns to step S133; otherwise, the process ends.

S133, the core network element of the source network transmits information of the UE to an eNodeB of a target network through an S1 interface.

In this embodiment, step S131 to step S133 can be implemented with reference to the step S401 to step S403 in the embodiment shown in FIG. 11, and no details will be given herein.

Figure 20:
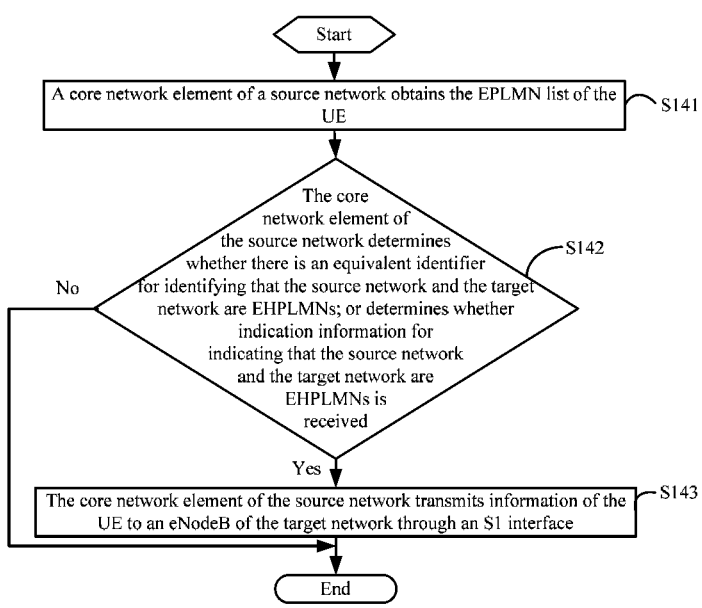
FIG. 20 is a flow chart of a method for information transmission according to another embodiment of the present invention.

FIG. 20 is a flow chart of a method for information transmission according to another embodiment of the present invention; in this embodiment, a handover determination is made based on an EPLMN list of the UE. The method includes:

S141, a core network element of a source network obtains the EPLMN list.

S142, the core network element of the source network determines whether there is an equivalent identifier for identifying that the source network and the target network are EHPLMNs; or determines whether indication information for indicating that the source network and the target network are EHPLMNs is received, if the determining result is yes, the process turns to step S143; otherwise, the process ends.

S143, the core network element of the source network transmits information of the UE to an eNodeB of the target network through an S1 interface.

In this embodiment, step S141 to step S143 can be implemented with reference to the step S501 to step S503 in the embodiment shown in FIG. 12, and no details will be given herein.

The method for information transmission will be described in details hereinafter with reference to FIGS. 21 to 24 when the network entity of the source network is a core network element and the network entity of the target network is an RNC.

Figure 21:
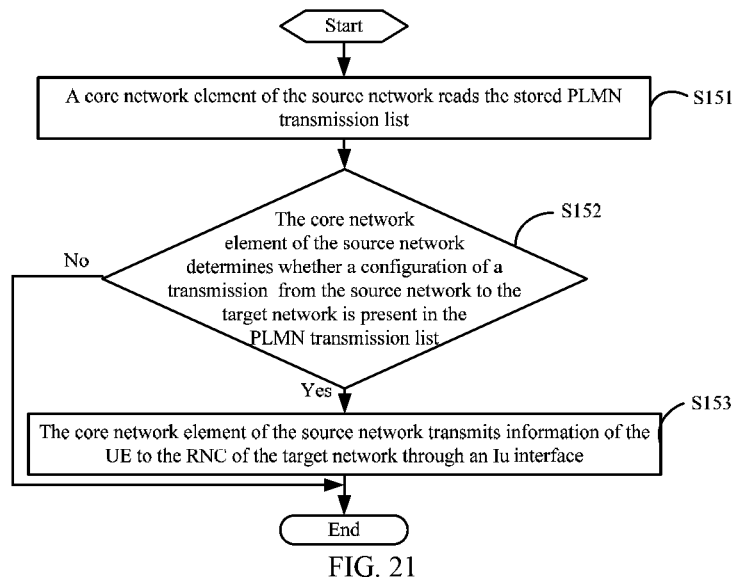
FIG. 21 is a flow chart of a method for information transmission according to another embodiment of the present invention.

FIG. 21 is a flow chart of a method for information transmission according to another embodiment of the present invention; in this embodiment, a handover determination is made based on a PLMN transmission list stored in the network entity of the source network. The method includes:

S151, when a UE performs a handover from the source network to a target network, a core network element of the source network reads the stored PLMN transmission list.

S152, the core network element of the source network determines whether a configuration of a transmission from the source network to the target network is present in the PLMN transmission list, if the determining result is yes, the process turns to step S153; otherwise, the process ends.

S153, the core network element of the source network transmits information of the UE to the RNC of the target network through an Iu interface.

In this embodiment, step S151 to step S153 can be implemented with reference to the step S201 to step S203 in the embodiment shown in FIG. 9, and no details will be given herein.

Figure 22:
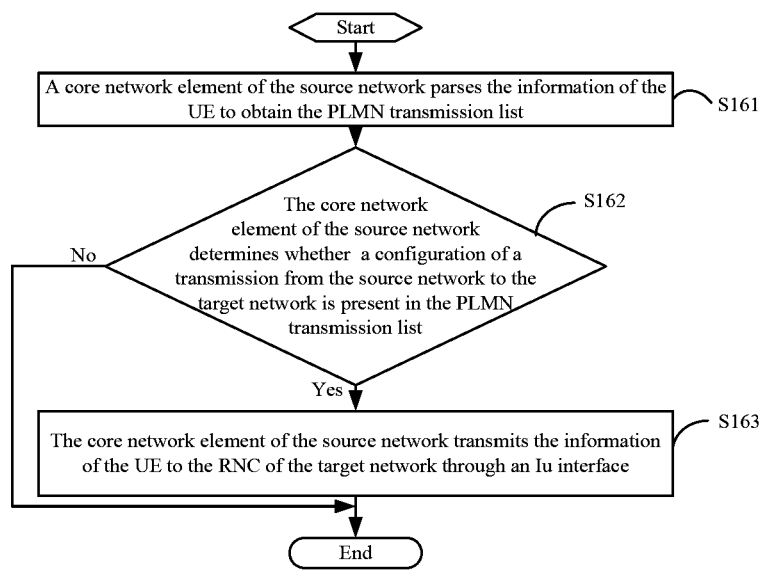
FIG. 22 is a flow chart of a method for information transmission according to another embodiment of the present invention.

FIG. 22 is a flow chart of a method for information transmission according to another embodiment of the present invention; in this embodiment, a handover determination is made based on a PLMN transmission list included in information of the UE. The method includes:

S161, a core network element of the source network parses the information of the UE to obtain the PLMN transmission list.

S162, the core network element of the source network determines whether a configuration of a transmission from the source network to the target network is present in the PLMN transmission list, if the determining result is yes, the process turns to step S163; otherwise, the process ends.

S163, the core network element of the source network transmits the information of the UE to the RNC of the target network through an Iu interface.

In this embodiment, step S161 to step S163 can be implemented with reference to the step S301 to step S303 in the embodiment shown in FIG. 10, and no details will be given herein.

Figure 23:
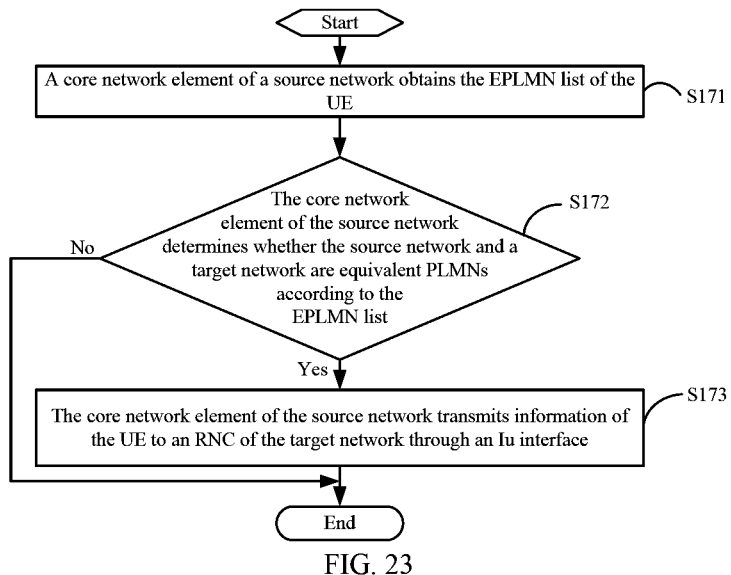
FIG. 23 is a flow chart of a method for information transmission according to another embodiment of the present invention.

FIG. 23 is a flow chart of a method for information transmission according to another embodiment of the present invention; in this embodiment, a handover determining is made based on an EPLMN list. The method includes:

S171, a core network element of a source network obtains the EPLMN list of the UE.

S172, the core network element of the source network determines whether the source network and a target network are equivalent PLMNs according to the EPLMN list, if the determining result is yes, the process turns to step S173; otherwise, the process ends.

S173, the core network element of the source network transmits information of the UE to an RNC of the target network through an Iu interface.

In this embodiment, step S171 to step S173 can be implemented with reference to the step S401 to step S403 in the embodiment shown in FIG. 11, and no details will be given herein.

Figure 24:
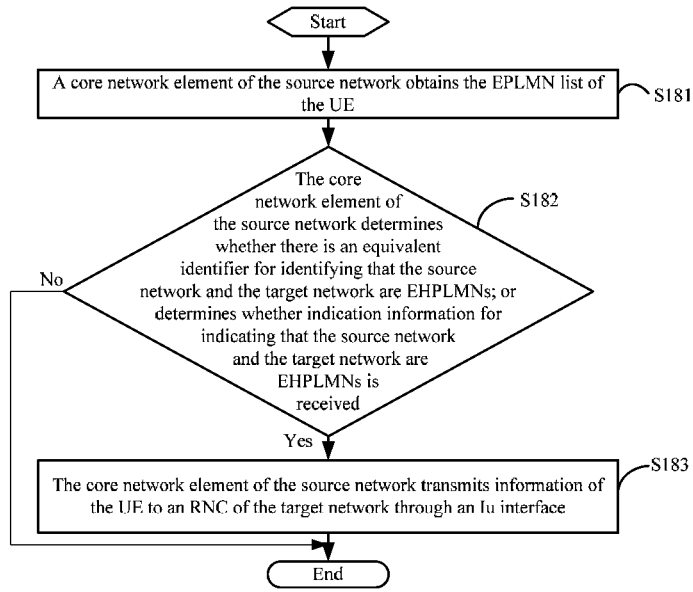
FIG. 24 is a flow chart of a method for information transmission according to another embodiment of the present invention.

FIG. 24 is a flow chart of a method for information transmission according to another embodiment of the present invention; in this embodiment, a handover determination is made based on an EPLMN list. The method includes:

S181, a core network element of the source network obtains the EPLMN list of the UE.

S182, the core network element of the source network determines whether there is an equivalent identifier for identifying that the source network and the target network are EHPLMNs; or determines whether indication information for indicating that the source network and the target network are EHPLMNs is received, if the determining result is yes, the process turns to step S183; otherwise, the process ends.

S183, the core network element of the source network transmits information of the UE to an RNC of the target network through an Iu interface.

In this embodiment, step S181 to step S183 can be implemented with reference to the step S501 to step S503 in the embodiment shown in FIG. 12, and no details will be given herein.

In the method for information transmission provided in embodiments of the present invention, when a UE performs a handover from a source network to a target network, if the handover satisfies the information transmission rule, the information of the UE can be transmitted from the source network to the target network, and because the target network can directly obtain the information of the UE from the source network, it is not necessary to re-initiate an MDT request to the UE so as to obtain the information of the UE from the UE, thus avoiding repeated operations of the UE for the MDT request, reducing the burden of the UE and meanwhile saving network resources.

Corresponding to the apparatus for information transmission provided in the embodiment of the present invention shown in FIG. 7, a method for information transmission provided in an embodiment of the present invention will be described in details with reference to FIG. 25, and the apparatus for information transmission provided in the above embodiment of the present invention can be applied to the method for information transmission provided in the following embodiment of the present invention.

Figure 25:
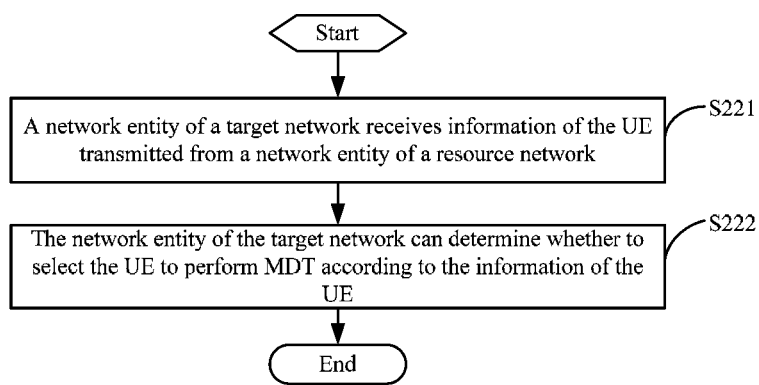
FIG. 25 is a flow chart of a method for information transmission according to another embodiment of the present invention.

FIG. 25 is a flow chart of a method for information transmission according to another embodiment of the present invention. The method includes:

S221, a network entity of a target network receives information of the UE transmitted from a network entity of a resource network.

The information of the UE includes: user consent information and/or MDT configuration information. In this embodiment, the network entity of the target network can include any one of an eNodeB, an RNC and a core network element; wherein the core network element includes any one of MME, MSC-S, SGW and SGSN.

If the network entity of the source network is an eNodeB and the network entity of the target network is an eNodeB, in step S221, then the eNodeB of the target network can receive the information of the UE transmitted by the eNodeB of the source network through an X2 interface. If the network entity of the source network is an RNC and the network entity of the target network is an RNC, in step S221, the RNC of the target network can receive the information of the UE transmitted by the RNC of the source network through an Iur interface. If the network entity of the source network is a core network element and the network entity of the target network is an eNodeB, in step S221, the eNodeB of the target network can receive the information of the UE transmitted by the core network element of the source network through an S1 interface. If the network entity of the source network is a core network element and the network entity of the target network is an RNC, in step S221, the RNC of the target network can receive the information of the UE transmitted by the core network element of the source network through an Iu interface.

S222, the network entity of the target network can determine whether to select the UE to perform MDT according to the information of the UE.

The user consent information of the UE can be user agreement information or user disagreement information; in step S221, if the user agreement information and/or MDT configuration information of the UE is received, in step S222, the network entity of the target network can determine to select the UE to perform MDT, or determine not to select the UE to perform MDT; in step S221, if the user disagreement information and/or MDT configuration information of the UE is received, in step S222, the network entity of the target network determines not to select the UE to perform MDT.

When a UE in this embodiment of the present invention performs a handover from a source network to a target network, if the handover satisfies the information transmission rule, the information of the UE can be transmitted from the source network to the target network, and because the target network can directly obtain the information of the UE from the source network, it is not necessary to re-initiate an MDT request to the UE so as to obtain the information of the UE from the UE, thus avoiding repeated operations of the UE for the MDT request, reducing the burden of the UE and meanwhile saving network resources.

As will be appreciated by persons skilled in the art, various illustrative logical blocks (illustrative logical block) and steps (step) listed in embodiments of the present invention may be implemented as electronic hardware, computer software, or combinations thereof. In order to clearly illustrate the interchangeability (interchangeability) of hardware and software, the above various illustrative components (illustrative components) and steps have been described above generally in terms of their functionality. Whether such functionality is implemented as hardware or software depends upon the particular application and design requirements imposed on the overall system. Persons skilled in the art may implement the described functionality in varying ways for each particular application, but such implementation should not be interpreted as causing a departure from the protection scope of embodiment of the present invention.

The various illustrative logical blocks and modules described in embodiments of the present invention may be implemented with general purpose processors, digital signal processors, application specific integrated circuits (ASIC), field programmable gate arrays (FPGA) or other programmable logic devices, discrete gates or transistor logics, discrete hardware components, or a design of any combination thereof or operated to perform the functions described herein. A general purpose processor may be a microprocessor, optionally, the general purpose processor also may be any conventional processor, controller, microcontroller, or state machine. The processor also can be implemented by a combination of computing devices, such as a digital signal processor and a microprocessor, a plurality of microprocessors, one or more microprocessors in combination with a digital signal processor and/or other similar arrangements.

The steps of the method described in embodiments of the present invention may be embedded directly in hardware, in a software module executed by a processor, or in a combination thereof. The software module can be stored in a RAM memory, a flash memory, a ROM memory, an EPROM memory, an EEPROM memory, a register, a hard disk, a removable disk, a CD-ROM, or any other form of storage medium known in the art. An exemplary storage medium can be coupled to the processor such that the processor can read information from, and write information to, the storage medium. In the alternative, the storage medium also can be integral to the processor. The processor and the storage medium can reside in an ASIC, and the ASIC may reside in a user terminal. Optionally, the processor and the storage medium also can reside in different components of a user terminal.

In one or more exemplary designs, the above functions described in embodiments of the present invention can be implemented using hardware, software, firmware, or any combination of all three. If implemented in software, these functions may be stored on a computer-readable medium or transmitted to the computer-readable medium in a form of one or more instructions or codes. The computer-readable medium includes both computer storage medium and communication medium that facilitates transfer of a computer program from one place to another. The storage medium can be any available medium that can be accessed by a general purpose or special purpose computer. For example, such computer-readable medium can include, but be not limited to, RAM, ROM, EEPROM, CD-ROM or other optical disk storage, magnetic disk storage or other magnetic storage devices, or any other medium that can be used to carry or store program codes in the form of instructions or data structures and that can be accessed by a general purpose or special purpose computer, or a general purpose or special purpose processor. Furthermore, any connection may be appropriately defined as a computer-readable medium, for example, if software is transmitted from a website, server, or other remote source using a coaxial cable, fiber optic cable, twisted pair, digital subscriber line (DSL), or wireless technologies such as infrared, radio, and microwave, which is included in the definition of the computer-readable medium. The disk (disk) and disc (disc) include compact disc, laser disc, optical disc, DVD, floppy disk and blue-ray disc where the disks usually reproduce data magnetically, while the discs reproduce data optically by laser. Combinations of the above also can be included within the machine-readable medium.

Persons skilled in the art can utilize or implement contents of the present invention with reference to the above description in the specification of the present invention, any modification based on the content disclosed above should be considered to be obvious in the art, and general principles described herein may be applied to other variations without departing from the essence and scope of the present invention. Therefore, contents disclosed in the present invention are not intended to be limited to the embodiments and designs described herein, but are to be extended to the widest scope consistent with the principles and novel features disclosed herein.

What is claimed is:

1. A method for information transmission, comprising:
performing, by a network entity of a source public land mobile network (PLMN), a handover of a user equipment (UE) from the source PLMN to a target PLMN;
determining, by the network entity of the source PLMN, whether a configuration of a transmission from the source PLMN to the target PLMN is present in a PLMN transmission list, wherein, the source PLMN and the target PLMN are different PLMNs, and the configuration of the transmission from the source PLMN to the target PLMN includes at least one of a configuration of an unidirectional transmission from the source PLMN to the target PLMN and a configuration of a bidirectional transmission between the source PLMN and the target PLMN; and
transmitting, by the network entity of the source PLMN, information of the UE to a network entity of the target PLMN when the configuration of the transmission from the source PLMN to the target PLMN is present in the PLMN transmission list;
wherein the information of the UE includes one or more of the group consisting of: minimization of drive tests (MDT) allowed status information of the UE and MDT configuration information of the UE.

2. The method according to claim 1, wherein the PLMN transmission list is stored in the network entity of the source PLMN, and wherein before the determining, by the network entity of the source PLMN, whether the configuration of the transmission from the source PLMN to the target PLMN is present in the PLMN transmission list, the method further comprises:
reading, by the network entity of the source PLMN, the PLMN transmission list.

3. The method according to claim 1, wherein the PLMN transmission list is included in the information of the UE, and
wherein before the determining, by the network entity of the source PLMN, whether the configuration of the transmission from the source PLMN to the target PLMN is present in the PLMN transmission list, the method further comprises:
parsing, by the network entity of the source PLMN, the information of the UE to obtain the PLMN transmission list.

4. The method according to claim 1, wherein the network entity of the source PLMN includes one or more of the group consisting of: an evolved Node B (eNodeB), a radio network controller (RNC), and a core network element;
wherein the network entity of the target PLMN includes one or more of the group consisting of: an eNodeB, an RNC, and a core network element; and
wherein a core network element includes one or more of the group consisting of: a mobility management entity (MME), a mobile switching center server (MSC-S), a signaling gateway (SGW), and a serving GPRS support node (SGSN).

5. The method according to claim 4, wherein, the network entity of the source PLMN and the network entity of the target PLMN are eNodeB s;
wherein the transmitting, by the network entity of the source PLMN, the information of the UE to the network entity of the target PLMN, comprises
transmitting, by the eNodeB of the source PLMN, the information of the UE to the eNodeB of the target PLMN through an X2 interface; and
wherein the X2 interface is an interface between the eNodeB of the source PLMN and the eNodeB of the target PLMN.

6. The method according to claim 4, wherein, the network entity of the source PLMN and the network entity of the target PLMN are RNC s;
wherein the transmitting, by the network entity of the source PLMN, the information of the UE to the network entity of the target PLMN, comprises
transmitting, by the RNC of the source PLMN, the information of the UE to the RNC of the target PLMN through an Iur interface; and
wherein the Iur interface is an interface between the RNC of the source PLMN and the RNC of the target PLMN.

7. The method according to claim 4, wherein, the network entity of the source PLMN is a core network element and the network entity of the target PLMN is an eNodeB;
wherein the transmitting, by the network entity of the source PLMN, the information of the UE to the network entity of the target PLMN, comprises transmitting, by the core network element of the source PLMN, the information of the UE to the eNodeB of the target PLMN through an S1 interface; and
wherein the S1 interface is an interface between the core network element and the eNodeB.

8. The method according to claim 4, wherein, if the network entity of the source PLMN is a core network element and the network entity of the target PLMN is an RNC;
wherein the transmitting, by the network entity of the source PLMN, the information of the UE to the network entity of the target PLMN, comprises
transmitting, by the core network element of the source PLMN, the information of the UE to the RNC of the target PLMN through an Iu interface; and
wherein the Iu interface is an interface between the core network element and the RNC.

9. A non-transitory computer readable medium including computer-executable instructions for execution on an apparatus for information transmission such that when the computer-executable instructions are executed by the apparatus a method is carried out, comprising:
performing a handover of a user equipment (UE) from a source public land mobile network (PLMN) to a target PLMN;
determining whether a configuration of a transmission from the source PLMN to the target PLMN is present in a PLMN transmission list, wherein, the source PLMN and the target PLMN are different PLMNs, and the configuration of the transmission from the source PLMN to the target PLMN includes at least one of a configuration of an unidirectional transmission from the source PLMN to the target PLMN and a configuration of a bidirectional transmission between the source PLMN and the target PLMN; and
transmitting information of the UE to a network entity of the target PLMN when the configuration of the transmission from the source PLMN to the target PLMN is present in the PLMN transmission list;
wherein the information of the UE includes one or more of the group consisting of: minimization of drive tests (MDT) allowed status information of the UE and MDT configuration information of the UE.

10. The apparatus according to claim 9, wherein the PLMN transmission list is stored in the apparatus for information transmission, and
wherein the processor is configured to read the stored PLMN transmission list before determine whether the configuration of the transmission from the source PLMN to the target PLMN is present in the PLMN transmission list.

11. The apparatus according to claim 9, wherein the PLMN transmission list is included in the information of the UE, and
wherein the processor is configured to parse the information of the UE to obtain the PLMN transmission list after determine whether the configuration of the transmission from the source PLMN to the target PLMN is present in the PLMN transmission list.

12. The apparatus according to claim 9, wherein the apparatus for information transmission is a network entity of the source PLMN;
wherein the network entity comprises any one of an evolved Node B (eNodeB), a radio network controller (RNC) and a core network element; and
wherein the core network element comprises any one of a mobility management entity (MME), a mobile switching center server (MSC-S), a signaling gateway (SGW) and a serving GPRS support node (SGSN).

13. The apparatus according to claim 12, wherein when the network entity of the source PLMN is an eNodeB and a network entity of the target PLMN is an eNodeB, the transmitter transmits the information of the UE to the eNodeB of the target PLMN through an X2 interface;
wherein when the network entity of the source PLMN is an RNC and a network entity of the target PLMN is an RNC, the transmitter transmits the information of the UE to the RNC of the target PLMN through an Iur interface;
wherein when the network entity of the source PLMN is a core network element and a network entity of the target PLMN is an eNodeB, the transmitter transmits the information of the UE to the eNodeB of the target PLMN through an S1 interface; and
wherein when the network entity of the source PLMN is a core network element and a network entity of the target PLMN is the RNC, the transmitter transmits the information of the UE to the RNC of the target PLMN through an Iu interface.

14. A system for information transmission, comprising:
a non-transitory computer readable medium including computer-executable instructions for execution on an apparatus for information transmission such that when the computer-executable instructions are executed by the apparatus a method is carried out, comprising:
performing a handover of a user equipment (UE) from a source public land mobile network (PLMN) to a target-PLMN;
determining whether a configuration of a transmission from the source PLMN to the target PLMN is present in a PLMN transmission list, wherein, the source PLMN and the target PLMN are different PLMNs, and configuration of the transmission from the source PLMN to the target PLMN includes at least one of a configuration of an unidirectional transmission from the source PLMN to the target PLMN and a configuration of a bidirectional transmission between the source PLMN and the target PLMN; and
transmitting information of the UE to a network entity of the target PLMN when the configuration of the transmission from the source PLMN to the target PLMN is present in the PLMN transmission list;
wherein the information of the UE includes one or more of the group consisting of: minimization of drive tests (MDT) allowed status information of the UE and MDT configuration information of the UE.

* * * * *